United States Patent
Ghebremeskel et al.

(10) Patent No.: US 11,549,046 B2
(45) Date of Patent: Jan. 10, 2023

(54) PARTICULATE POLYVINYL ALCOHOL PLUGGING AGENTS

(71) Applicant: KURARAY CO., LTD., Kurashiki (JP)

(72) Inventors: Ghebrehiwet Ghebremeskel, Houston, TX (US); Keisuke Morikawa, Houston, TX (US); Yasuhiro Tajima, Kurashiki (JP)

(73) Assignee: KURARAY CO., LTD., Kurashiki (JP)

(*) Notice: Subject to any disclaimer, the term of this patent is extended or adjusted under 35 U.S.C. 154(b) by 0 days.

(21) Appl. No.: 17/160,445

(22) Filed: Jan. 28, 2021

(65) Prior Publication Data
US 2021/0238467 A1   Aug. 5, 2021

Related U.S. Application Data

(60) Provisional application No. 62/967,940, filed on Jan. 30, 2020.

(51) Int. Cl.
| | |
|---|---|
| *C09K 8/508* | (2006.01) |
| *C09K 8/588* | (2006.01) |
| *E21B 43/16* | (2006.01) |

(52) U.S. Cl.
CPC ............ *C09K 8/5083* (2013.01); *C09K 8/588* (2013.01); *E21B 43/16* (2013.01)

(58) Field of Classification Search
None
See application file for complete search history.

(56) References Cited

U.S. PATENT DOCUMENTS

| | | | | |
|---|---|---|---|---|
| 3,448,800 | A * | 6/1969 | Wahl ................... | E21B 33/138 175/72 |
| 3,741,307 | A * | 6/1973 | Sandiford ............... | E21B 43/16 166/400 |
| 3,882,938 | A * | 5/1975 | Bernard .................. | C09K 8/50 166/292 |
| 4,140,183 | A * | 2/1979 | Holm .................... | C09K 8/845 166/400 |
| 5,728,210 | A * | 3/1998 | Moran .................. | C09K 8/487 106/781 |
| 8,623,936 | B2 * | 1/2014 | Roddy .................... | C09K 8/88 106/713 |
| 2006/0041060 | A1 * | 2/2006 | George .................. | C04B 28/02 524/3 |
| 2007/0284104 | A1 * | 12/2007 | Beckman ................ | C04B 28/02 106/804 |
| 2009/0008095 | A1 * | 1/2009 | Duncum ................ | C09K 8/502 166/276 |
| 2012/0073813 | A1 * | 3/2012 | Zamora .................. | C09K 8/032 166/305.1 |
| 2016/0312103 | A1 * | 10/2016 | Wahal ................... | C09K 8/528 |
| 2018/0223168 | A1 * | 8/2018 | Al-Yami ................ | C09K 23/00 |
| 2019/0153290 | A1 * | 5/2019 | Katou ................... | E21B 43/261 |
| 2021/0269700 | A1 * | 9/2021 | Tajima .................. | C08F 218/08 |
| 2021/0380864 | A1 * | 12/2021 | Ghebremeskel ..... | C09K 8/5083 |

* cited by examiner

*Primary Examiner* — John J Figueroa
(74) *Attorney, Agent, or Firm* — Oblon, McClelland, Maier & Neustadt, L.L.P.

(57) ABSTRACT

A particulate plugging agent, such as a diverting agent and/or loss circulation material, using a particular polyvinyl alcohol with a certain amount of monovalent metallic salt, which is water-soluble and has a buffer effect even if the environment is acidic, and thus stable, which in particular finds use in various subsurface oil production operations.

18 Claims, No Drawings

PARTICULATE POLYVINYL ALCOHOL PLUGGING AGENTS

CROSS-REFERENCE TO RELATED APPLICATIONS

This application claims priority under 35 U.S.C. § 119 from U.S. Provisional Application Ser. No. 62/967,940, filed 30 Jan. 2020, the disclosure of which is incorporated by reference herein for all purposes as if fully set forth.

FIELD OF THE INVENTION

This invention relates to a particulate plugging agent, such as a diverting agent and/or loss circulation material, using a particular polyvinyl alcohol with a certain amount of monovalent metallic salt, which is water-soluble and has a buffer effect even if the environment is acidic, and thus stable, which in particular finds use in various subsurface oil production operations.

BACKGROUND OF THE INVENTION

During oil production from subterranean formations by natural forces, only a small fraction of the total oil present in the reservoir is recovered. A variety of techniques have been developed to recover oil beyond that which is produced by the natural forces. One common procedure is to introduce a fluid into the oil-bearing formation in order to displace the oil to a production system comprising one or more production wells. The displacing fluid may, for example, be brine, fresh water, steam or gas. The most cost-effective recovery methods typically utilize steam.

One technique for increasing production is to increase the porosity of the oil-bearing formation by injection of a high-pressure drive fluid to fracture the formation, thereby allowing further access of the displacing fluid into the oil-bearing formation.

Some of the common injection drive fluids are much lighter than the reservoir fluids and thus rise toward the top of the flowing region bypassing the lower regions. In that case, the displacement of the oil from the formation is improved by the addition of the polymeric thickening agents that increase the effective viscosity of the drive fluid to match to that of the oil to be displaced.

Such injection fluids preferentially enter higher permeability areas (typically containing less oil), thus not reaching their intended targets (lower permeability areas). It is therefore desirable to plug the regions of higher permeability with a "diverting agent" to divert the drive fluid into regions of lower permeability. It is also desirable that the diverting agent possess a property of controlled solubility wherein a satisfactory solid plug is formed for a period of time after which the plug is removed without further effort or treatment, for example, by being slowly dissolved.

Physical plugging of the high permeability regions by cements and solid slurries has been tried with varying degrees of success. These techniques, however, have the drawback that they may remain intact for extended periods (or even permanently), and still-productive sites may consequently be permanently closed or require extraordinary efforts to reopen.

Several techniques of addressing the issue with the areas of differing permeability within a wellbore have been disclosed in the patent literature.

For example, U.S. Pat. No. 2,803,306 discloses a process for increasing the permeability of an underground formation having several zones of varying permeability. The treatment fluid that was utilized contains HCl with oil-soluble particles dispersed in it. The dispersed particles provide a partial blockage of the permeable zones of the subterranean formation, thereby allowing the treatment fluid to enter the less-permeable zones.

U.S. Pat. No. 3,724,549 describes a material for diverting aqueous treatment fluids into the less permeable subterranean formations. The described material is composed of a carrier liquid and graded particles of cyclic or linear hydrocarbon resins having between 20 and 1400 carbon atoms, and a melting point of about 200° F. The particles sizes were in the range of 3 mesh to 200 mesh sieve. The particles are described as being water and acid insoluble, but soluble in oil. This means that the particles were designed to be removed by the produced oil after the completion of the treatment operation.

U.S. Pat. No. 3,797,575 discloses diverting-forming additives comprised of relatively water-insoluble solid material dissolved in a solvent such as methanol or isopropanol. When the additive is combined with an aqueous treatment fluid, the solid material, dissolved in the additive, is precipitated in the aqueous treating fluid into a finely divided form, which then acts as a diverting agent.

U.S. Pat. No. 3,872,923 discloses the use of certain radiation-induced polymers as either temporary or permanent diverting agents. Temporary or permanent reductions in permeability were obtained by injecting an aqueous solution containing a water-soluble polymer obtained by radiation-induced polymerization of acrylamide and/or methacrylamide and acrylic acid, methacrylic acid, and/or alkali metal salts of such acids. The resultant polymeric diverting agent has properties, such as temperature and pH stability, so as to effect a reduction of permeability of the porous medium. Permeability within the formation can be restored by subsequent treatment with a chemical to break down the polymer, such as hydrazine hypochlorite solution or strong mineral acids.

U.S. Pat. Nos. 3,954,629 and 4,005,753 disclose polymeric diverting agents, and methods of treating subterranean formations with such polymeric diverting agents. The disclosed polymeric compositions comprise solid particles of a homogenous mixture of polyethylene, ethylene-vinyl acetate copolymer, a polyamide, and a softening agent such as a long chain aliphatic di amide. The disclosed polymeric diverting agents are said to be suitable for use in subterranean formations where formation temperatures are 350° F. or higher, and are also said to have controlled oil-solubility for ultimate removal.

U.S. Pat. No. 4,527,628 describes methods of temporarily plugging a subterranean formation using a diverting material comprising an aqueous carrier liquid and a diverting agent comprising a solid azo component and a methylenic component having a melting point of at least 332.6° F., a degree of solubility in water at a temperature of about 200° F. to about 425° F., and a degree of solubility in kerosene at a temperature of about 200° F. to about 425° F.

U.S. Pat. No. 4,665,986 discloses a polyvinyl alcohol based gel-forming composition to reduce channeling in subsurface formations. The composition comprises a specified polyvinyl alcohol or copolymer and a crosslinking agent, which reacts to form a gel for stably plugging unproductive steam channels.

U.S. Pat. No. 6,367,548B1 describes methods and compositions for stimulating multiple intervals in subterranean wells by diverting well treatment fluids into multiple intervals. According to the invention, this was accomplished by alternately displacing diverting agent from the annulus of the wellbore into a subterranean formation and displacing treatment fluid from a tubing string into the subterranean formation.

US2011/0005761A1 describes a degradable diverting agent comprised of a material selected from a fatty alcohol, fatty ester, proteinous material and a fatty acid salt, which may be used in combination with other types of degradable diverting agents.

WO2006/088603A1 discloses the use of diverting agents coated with certain specified water-soluble materials including a collagen, poly(alkylene oxide), polylactic acid), polyvinyl alcohol and a polyvinyl acetate/polyvinyl alcohol polymer. Following completion of the treatment, the publication indicates that the diverting agent can be removed from the formation by dissolving the water-soluble coating.

WO2018/231236A1 and WO2019/031613A1 disclose diverting agents comprising polyvinyl alcohol. The publications indicate that the diverting agents have a unique solubility in warm water.

The water-soluble materials can also be applied to lost circulation materials.

During drilling operations for oil production from subterranean formations, drilling fluids are pumped down through the drill pipe, through openings in the drill bit, and then upward to ground level, where the fluid is screened of the accumulated cuttings and is re-circulated through the system.

The functions of the drilling fluids include, for example, to lubricate the drilling tool and drill pipe, to provide a medium for removing formation cuttings from the well to the surface, to counterbalance formation pressure in order to prevent the inflow to the well bore of gas, oil, and/or water from permeable or porous formations which may be encountered at various levels as drilling progresses, to maintain hole stability prior to setting the casing, to minimize formation damage, and to hold the drill cuttings in suspension.

It is necessary for the drilling fluid to circulate in the wellbore (down the drill pipe and back up the annulus) in order to perform all of the desired functions.

A problem which sometimes occurs in the oil field is the loss of the drilling fluids into the permeable zones of the wellbore, which can dramatically increase the costs of the drilling operation.

In order to minimize the loss of the circulation fluids, it is desirable to plug the flow passages responsible for the fluid losses.

Drilling fluids are designed to seal porous formations while drilling; this occurs as the result of suction of the fluid onto the permeable surface (pressure greater in the well than in the formation) and the creation of a mud cake to seal a porous formation during drilling and for the purpose of wellbore stabilization.

The loss of fluids to the formation can reach an extent such that no mud cake can be created to secure the surface and create an effective barrier. In extreme situations, when the borehole penetrates a fracture in the formation through which most of the drilling fluid may be lost, the rate of loss may exceed the rate of replacement. Drilling operations may have to be stopped until the lost circulation zone is sealed and fluid loss to the fracture is reduced to an acceptable level. In the worst case, the consequences of this problem can be loss of the well.

Several techniques have been developed to cure or to reduce lost circulation of mud to the wellbore. Curing lost circulation while drilling is the subject of many publications and patents.

For example, certain drilling fluid additives can form a thin, low permeability filter cake that can seal openings in formations to educe the unwanted influx of fluids or the loss of drilling fluids to permeable formations.

Lost circulation materials (LCMs) capable of bridging or blocking seepage into the formation can also be added to the drilling fluid. Many different types of materials have been added to drilling fluids as LCMs.

Additional disclosures of the use of polyvinyl alcohols as diverting agents and/or loss circulation materials include, for example, commonly-owned U.S. patent application Ser. Nos. 16/554,078, 16/554,126, 16/554,177 and 16/554,231 (all filed 28 Aug. 2019).

Polyvinyl alcohol optionally in combination with other materials have also been described as a fluid loss additive for use in cement for cementing oil and gas well bores. See, for example, U.S. Pat. Nos. 5,105,885, 5,207,831, US2006/0041060A1 and EP0587383A1.

Subterranean environments are sometimes acidic, and contain a lot of multivalent metallic salts such as calcium salts. In such environments, it has been found that polyvinyl alcohol materials can be physically affected, for example, the solubility in water of polyvinyl alcohol-based plugging materials may tend to decrease due to cation crosslinking, which can affect their performance and removability.

It is, therefore, an object of the present invention to provide a particulate polyvinyl alcohol-based plugging agent that reduces this negative effect.

SUMMARY OF THE INVENTION

In order to address the above problem, it has been found that the addition of certain monovalent metallic salts in specified amounts to such polyvinyl alcohol-based plugging agents can reduce the consequences of an acidic (high multivalent salt content) wellbore environment.

More specifically, the present invention provides a plugging agent comprising particles of an intimate mixture of a polyvinyl alcohol resin component with from about 0.1 to about 20 parts by weight of a monovalent metallic salt component, based on 100 parts by weight of the polyvinyl alcohol resin component.

In one embodiment, the plugging agent particles further comprises at least one additional additive selected from the group consisting of a plasticizer, starch and a filler.

In one embodiment, the plugging agent further comprises from 1 to 30 parts by weight of sand, based on 100 parts by weight of the polyvinyl alcohol resin component.

In one embodiment, the polyvinyl alcohol resin component comprises a hydrolyzed copolymer of vinyl acetate and one or more unsaturated acids as comonomers, wherein:
(a) the unsaturated acid is selected from the group consisting of
(i) a monocarboxylic unsaturated acid,
(ii) a dicarboxylic unsaturated acid,
(iii) an alkyl ester of either (i) or (ii),
(iv) an alkali metal salt of either (i) or (ii),
(v) an alkaline earth metal salt of either (i) or (ii), and,
(vi) an anhydride of either (i) or (ii),
and (h) the hydrolyzed copolymer
(i) has an unsaturated acid content of from 0.1 mol % to 15 mol % based on the total moles of monomers,
(ii) has a viscosity-average degree of polymerization of from 300 to 3000, and
(iii) has a degree of hydrolysis of from 70 mol % to 100 mol %.

In another embodiment, the polyvinyl alcohol resin component is a partially- or fully-hydrolyzed polyvinyl acetate homopolymer.

In another embodiment, the polyvinyl alcohol resin component is a mixture of two or more different polyvinyl alcohol resins.

In yet another embodiment, the polyvinyl alcohol resin component is a transition product as explained below.

The particulate plugging agents of the present invention are prepared by mixing the polyvinyl alcohol resin component, monovalent metallic salt component and any other optional additives, then granulating or pelletizing the resulting mixture. As the polyvinyl alcohol resin adheres to itself in the pelletization or granulation process, no additional binder is needed to agglomerate the mixture. In other words, the specified polyvinyl alcohol component functions as the binder for the pellet or granule. Additives such as fillers, starches, and plasticizers are added to the mixture as necessary. The plugging agent particles can be made using conventional pelletization and granulation methods and equipment.

The particulate plugging agents of the present invention are particularly suitable for use in subterranean formations where formation temperatures are typically about 200° F. or lower. In some cases, however, the particulate plugging agents can have suitable stability for sufficient time periods at temperatures of up to about 250° F.

The present invention thus also relates to a method of treating a subsurface formation to divert flow of a fluid from one zone of the subsurface formation to another, by pumping into the subsurface formation an aqueous carrier liquid having dispersed therein the particulate plugging agent.

An additional advantage of the polyvinyl alcohol-based particulate plugging agents of the present invention is that they are environmentally friendly as they are temporary, and the specified polyvinyl alcohols are considered non-toxic and biodegradable.

In another embodiment of the method, consequently, the plugging agent is temporary and subsequently removed by dissolution.

These and other embodiments, features and advantages of the present invention will be more readily understood by those of ordinary skill in the art from a reading of the following detailed description.

DETAILED DESCRIPTION

The present invention relates to particulate polyvinyl alcohol-based plugging agents for use in subterranean treatments. In particular, the present invention relates particular polyvinyl alcohol with a certain amount of monovalent metallic salt, which is water-soluble and has a buffer effect even if the environment is acidic, and thus stable. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely, for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates or pellets) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) pellet size" means at least about X % of the sample's pellets have the specified dimension. For example, "D(90) pellet size" means at least about 90% of the sample's pellets have the specified dimension.

The term "substantially soluble in water" and "souls water" means substantially completely (or completely) soluble in deionized water under the stated conditions.

The term "substantially soluble in brine" and "soluble in brine" means substantially completely (or completely) soluble in "brine" under the stated conditions. For the purposes of the present invention, "brine" generally means a water solution with NaCl concentration of up to 2.9 wt %.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Resin Component

The resins used in the manufacture of the particulate plugging agents of this invention are polyvinyl alcohol based. The compositions hereof can contain polyvinyl alcohol homopolymers and/or copolymers, both of which are in a general sense well-known polymers and are generally commercially available in many forms for a variety of end-uses, A typical polyvinyl alcohol suitable for use herein is described in, for example, US2017/0260309A1 and US2019/0055326A1, as well as U.S. Pat. Nos. 2,734,048, 3,497,487, 3,654,247 and 4,119,604, as well as.

Polyvinyl alcohol is produced on a commercial scale by polymerizing a vinyl ester (with optional comonomers) to generate a polyvinyl ester, after which the ester groups are hydrolyzed to hydroxyl groups in varying degrees. Examples of vinyl esters suitable for use herein as a starting material include vinyl acetate, vinyl propionate, vinyl stearate, vinyl overstate, vinyl pivalate, vinyl formate, vinyl maleate, vinyl captivate, vinyl laureate, and vinyl carboxylate copolymers, such as ethylene-vinyl acetate copolymer. For reasons of economy, availability and performance, vinyl acetate is preferred. Several different hydrolysis methods are well-known and can be used for this purpose.

A polyvinyl acetate starting material is thus typically produced by the free radical polymerization of a vinyl acetate monomer in the presence of a polymerization catalyst. The solvent commonly used in the commercial polymerization of vinyl acetate is a hydrolytic alcohol such as methanol, ethanol, the propanols or the monomethyl ether of ethylene glycol. Methanol is preferred. The polymerization is typically conducted in the temperature range of from about 10° C. to about 80° C. The lower end of the polymerization range is known to give products with improved properties. The percent conversion of vinyl acetate to polyvinyl acetate can vary Over a wide range. Though conversions ranging from about 20% to 100% have been found satisfactory, commercially at least about 30% conversion is preferable.

Polyvinyl alcohol polymers for use in this invention can include those prepared from polyvinyl acetate copolymers, such as hydrolyzed "acid-functional" polyvinyl acetate copolymers, which can contain one or more "acid-functional" comonomers. The "acid-functional" comonomer is, for example, one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Particular examples of such acid-functional comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, and itaconic anhydride.

In one embodiment, preferred are lower alkyl ($C_2$~$C_8$, or $C_2$~$C_4$) acrylates and methacryles. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers also include methyl acrylate, methyl methacrylate and mixtures thereof, and particularly methyl acrylate.

In another embodiment, preferred are itaconic acid and its derivatives as indicated above.

Examples of commercially available polyvinyl alcohols containing acid-functional comonomers include those available under the trade designation KURARAY POVAL™ K-series grades such as 32-97KL, 25-88KL, 6-77KL and 30-94KL (Kuraray Co., Ltd., Tokyo Japan), or ELVANOL™ 80-18 (Kuraray America, Inc., Houston, Tex. USA).

Other polyvinyl acetate copolymers useful herein to prepare a polyvinyl alcohol composition are those copolymers prepared from a vinyl ester, such as vinyl acetate as discussed above, and an olefinic comonomer. Suitable olefinic comonomers for use herein include without limitation ethylene, propylene, optionally branched $C_4$-$C_{20}$ α-olefins, optionally branched $C_4$-$C_{20}$ internal olefins, optionally branched $C_4$-$C_{20}$ vinylidene olefins, optionally branched $C_4$-$C_{20}$ cyclic olefins and optionally branched $C_4$-$C_{20}$ dienes, as well as optionally branched $C_4$-$C_{20}$ functionalized olefins. Any of the $C_4$-$C_{20}$ compounds listed in the preceding sentence may instead suitably be a $C_4$-$C_{12}$ or a $C_4$-$C_8$ compound. Examples of suitable olefinic monomers include without limitation ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, styrene, 2-butene, 4-methyl-1-pentene, ethyl-1-hexene, cyciohexene, norbomene, mixtures thereof and the like. Preferred are ethylene in combination with a $C_3$-$C_8$ α-olefin; more preferred is ethylene. In addition, combinations of an acid-functional comonomer and an olefinic comonomer can also be used.

The comonomer content of a polyvinyl acetate copolymer (and thus the resulting polyvinyl alcohol copolymer) ranges from about 0.1 mol %, or from about 0.5 mol %, or from about 1 mol %, to about 15 mol %, or to about 10 mol %, or to about 8 mol %, or to about 6 mol %, or about 4 mol %, or to about 3 mol %, depending on the particular comonomer(s).

The viscosity-average degree of polymerization of polyvinyl acetate (and resulting polyvinyl alcohol) varies anywhere from about 200, or from about 300, or from about 400, or from about 500, or from about 700, to about 6,000, or to about 4,000, or to about 3000, or to about 2000. The viscosity-average degree of polymerization of a polyvinyl alcohol polymer is measured in accordance with KS K6726 (1994), as described above.

In addition to crystallinity modification of a polyvinyl alcohol polymer, another method for controlling the dissolution time of a particulate composition hereof is by blending a first polyvinyl alcohol, such as an acid-functional polyvinyl alcohol copolymer, with one or more second fully- or partially-hydrolyzed polyvinyl alcohols. Such other polyvinyl alcohols may be chosen to be more soluble than the first polyvinyl alcohol polymer, but typically they are chosen to be less soluble and thus extend the dissolution rate of the compositions comprising the combination.

In one embodiment, a polyvinyl alcohol composition hereof comprises a blend, wherein a first polymer, such as a homopolymer or an acid-functional polyvinyl alcohol copolymer, is present in the blend in an amount of from about 10 wt %, or from about 20 wt %, or from about 25 wt %, or from about 33 wt %, or from about 40 wt %, to about 90 wt %, or to about 80 wt %, or to about 77 wt %, or to about 67 wt %, or to about 60 wt %, based on the total weight of all polyvinyl alcohol components. In such embodiment, a second polytrier is another polyvinyl alcohol that can, for example, be one or more partially- or fully-hydrolyzed polyvinyl alcohol homopolymers. Such polyvinyl alcohol homopolymers are generally commercially available, for example under the brands KURARAY POVAL™ and ELVANOL™ from Kuraray Co., Ltd. (Tokyo, Japan) and its affiliates, and are present in the blend in an amount that makes up the balance of the composition wherein the content of the first and second polymers totals to 100 wt %.

In another embodiment hereof, the polyvinyl alcohol resin is a transition product produced in a continuous hydrolysis process. Such transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process starts producing one grade of specified properties then transitions over time to a second grade of specified properties. This interim production is referred to as a transition grade.

In one embodiment, this transition grade is produced by transitioning production of a polyvinyl alcohol copolymer to production of a polyvinyl alcohol homopolymer (or vice versa). In this case, the polyvinyl alcohol homopolymer is less soluble than the polyvinyl alcohol copolymer so that the dissolution rate of the particulate composition can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl starting materials are used the average composition should fall within the blend proportions as described above.

Also included as polyvinyl alcohol resins to which this invention applies are compositions in which one or more —OH groups on a polymer chain has participated in a reaction to form a derivatized polymer. For example, the —OH groups can form inorganic esters such as when they react with boric acid, borates, lactates, sulfates, vanadyl compounds and/or substituted derivatives thereof, and mixtures of any two or more of the foregoing. Polyvinyl alcohol can also undergo Michaels addition with compounds containing activated double bonds, including for example acrylonitrile, acrylamide and vinyl aldehydes and ketones, including in each case substituted derivatives of, and mixtures of, the named reactants.

In other embodiments, the —OH group of a polyvinyl alcohol can form organic compounds such as the formation of an ester from a carboxylic acid or anhydride (e.g. acrylic or methacrylic acid, or maleic anhydride); the formation of a carbonate from a chloroformate; and the formation of a carbamate from a urea or isocyanate; including in each case substituted derivatives of, and mixtures of, the named reactants. Polyvinyl alcohol can also form an internal ether from the elimination of water, and can form an external ether from a reaction with a $C_2$ or higher, chloro-substituted carboxylic acid or ester thereof, including in each case substituted derivatives of, and mixtures of, the named reactants. Polyvinyl alcohols can also be crosslinked in a reaction with a multifunctional compound such as glyoxal, glutaraldehyde, urea, formaldehyde, melamine-formaldehyde, trimethylolmel amine sodium borate or boric acid, and isocyanates.

The polyvinyl alcohol resins used in this invention generally and preferably have the following properties.

The polyvinyl alcohol resin should have a degree of hydrolysis of from about 60 mol %, or from about 65 mol %, or from 70 mol %, or from about 75 mol %, or from about 85 mol %, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of from about 65 mol % to about 90 mol %, The degree of hydrolysis can be measured in accordance with JIS K6726 (1994).

Preferred volatile components and/or volatile impurities should be present in the polyvinyl alcohol in amount of less than about 2 wt %, or less than about 1.5 wt %, or less than about 1 wt %, based on the total weight of the polyvinyl alcohol resin.

Preferred water content of the polyvinyl alcohol resin should be less than 2 about wt % (determined according DIN 51777, method of Karl-Fischer).

Preferred methanol content of the polyvinyl alcohol resin should be less than about 2 wt %, or less than about 1.5 wt %, or less than about 1 wt %, based on the total weight of the polyvinyl alcohol resin.

Monovalent Metallic Salt Component

The plugging agent particles in this invention comprise a monovalent metallic salt (B).

The metallic part (cation) of the monovalent metallic salt (B) is preferably selected from lithium, sodium and potassium. The salt part (anion) of the monovalent metallic salt (B) is preferably selected from phosphate, carbonate and acetate. Preferred monovalent metallic salts are potassium carbonate, potassium phosphate, and sodium acetate, and mixtures thereof.

Combinations of more than one monovalent metallic salt are also suitable.

The content of the monovalent metallic salt (B) in the particulate plugging agent is preferably from about 0.1, or from about 0.2, or from about 0.8, or from about 1.4, to about 20, or to about 15, or to about 10, or to about 8, parts by weight per 100 parts by weight of polyvinyl alcohol resin component (A).

Optional Additives

The particulate plugging agents of the present invention may also optionally include one or more additives. Such additives include, for example, tillers, plasticizers and starches.

For example, fillers may be blended with the resin component to enhance mechanical properties and regulate the solubility curves of the diverting agents of the present invention.

The amount of filler added can vary widely depending on the desired property modification, for example, up to about 50 wt %, or up to about 30 wt %, or up to about 5 wt %, based on the total weight of the plugging agent.

In many instances it is desirable to have the specific gravity of the plugging agent to be close to that of carrier fluid in order to allow for pumping and satisfactory placement of the diverting agent using the selected carrier fluid.

In some of the embodiments of this invention, a weighting agent filler may be blended with the polyvinyl alcohol resin component. Weighting agent generally refers to any additive used to increase the density of the resin component.

Weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof.

Specific examples of fillers include minerals such as $CaCO_3$, $CaCl_2$ and ZnO.

In another embodiment of this invention from 1 to 30 parts by weight of sand, based on 100 parts by weight of the polyvinyl alcohol resin component may be blended with the polyvinyl alcohol resin component.

One skilled in the art will recognize that plasticizers may be included in manufacturing of the diverting agents of the present invention to improve the flow characteristics of the polyvinyl alcohol.

In order to obtain a uniform plasticizer coating it is preferred to utilize a spray mechanism to coat the polyvinyl alcohol.

A secondary effect of such plasticizers is to reduce any dusting issues with the polyvinyl alcohol materials and ultimate particulate diverting agents.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopentyl glycol, and mixtures of one or more of the above.

Plasticizers which are solid or crystalline at ambient temperatures, such as trimethylolpropane, may be dissolved in water or another liquid plasticizer medium for use as a sprayable plasticizer.

Typically the level of the plasticizer can vary up to about 40 wt %, or up to about 30 wt %, or up to about 20 wt %, based on the weight of the polyvinyl alcohol component.

Different plasticizers can also be blended to help tailor and control the solubility levels of the polyvinyl alcohol compositions and ultimate plugging agent.

In one embodiment, a plugging agent which yields a combination of good solubility properties and density comprises: (a) from about 60 wt % to about 94 wt % polyvinyl alcohol resin component, (b) from about 5 wt % to about 40 wt % filler and (c) from about 1 wt % to about 15 wt % plasticizer, based on the combined weight of (a), (b) and (c).

In yet another embodiment, the present invention provides a plugging agent comprising of a blend with a starch. Such blend can typically comprise from about 10 to about 90 parts by weight of the polyvinyl alcohol resin component and from about 90 to about 10 parts by weight of a starch, based on 100 parts by weight of the combination of polyvinyl alcohol resin component and starch. Preferably, however, there should be at least about 30 parts by weight polyvinyl alcohol resin component in any starch blend.

Suitable starches for use in the present invention include natural starches, synthetic starches, physically modified starches, chemically modified starches and mixtures thereof.

One or more other additives can be incorporated to the plugging agent as necessary. The additives include but are not limited to chelators, pH-adjusting agents, oxidizing agents, lost circulation materials, scale inhibitors, corrosion inhibitors, clay control additives, iron control additives, reducers, oxygen scavengers and the like. Use of such other additives in subsurface well operations is generally known to those of ordinary skill in the relevant art, as exemplified by many of the previously incorporated references.

The additives are blended with the polyvinyl alcohol resin prior to or during extrusion and/or granulation.

The total amount of additives (monovalent metallic salt plus optional additives) can vary widely depending on the desired property modification, for example, up to about 50 wt %, or up to about 40 wt %, or up to about 20 wt %, or up to about 10 wt %, based on the total weight of the plugging agent.

Preparation of Plugging Agents

The particulate plugging agents of the present invention are prepared by mixing the polyvinyl alcohol resin component, monovalent metallic salt component and any other optional additives, then granulating or pelletizing the resulting mixture. As the polyvinyl alcohol resin adheres to itself in the pelletization or granulation process, no additional binder is needed to agglomerate the mixture. In other words, the specified polyvinyl alcohol component functions as the binder for the pellet or granule.

The plugging agent particles can be made using conventional pelletization and granulation methods and equipment such as described, for example, in US2005001348A1. Pelletization and granulation methods are also disclosed in previously incorporated and commonly-owned U.S. patent application Ser. Nos. 16/554,078, 16/554,126, 16/554,177 and 16/554,231 (all filed 28 Aug. 2019).

In one embodiment, the particulate plugging agents of the present invention are prepared by compacting the polyvinyl alcohol component or mixtures described above under pressure.

The mixture compaction can be carried out using conventional compaction methods and equipment, such as a double roll compactor.

In a double roll compactor, the mixture is fed between two counter-rotating roll presses. The rolls apply extreme pressure to press the mixture into a sheet-like form. Desirably, the pressure applied during compaction is at least 5 T, or at least about 10 T. After a certain pressure point, the compaction reaches an effective maximum where there is very little increase in density per unit of additional pressure. In one embodiment of the present invention, this effective maximum is about 30 T of pressure. "T" refers to ton (US)/sq. inch.

Compaction should be sufficient to achieve the desired or necessary bulk density of the resulting particulate diverting agent as described below.

This sheet of material is then fed through a granulator, where it is broken up into sized granules that are random in shape but are desirably reasonably uniform in size. A screener sorts the agglomerated particles according to size. Particle that fall outside the desired size range are recycled from the screener back to the compactor and/or granulator.

Desirably such compaction and granulation is a dry process that does not require an additional drying step.

In another embodiment, the plugging agents can be prepared by conventional extrusion and pelletizing techniques.

For example, pellets can be made by compounding the various components in an extruder by a process commonly known to those skilled in the art. The components can be premixed before feeding into the extruder, can be separately fed into the extruder, or some combination thereof.

A twin-screw extruder is preferred because it can handle: a wider variety of components conditions (such as viscosity) and ultimately provides a good mixing of the components to produce a pellet of consistent composition.

The strand resulting from the extrusion is then cut into pieces to form the pellets.

The pellets can be made into any desired shaped depending on the extrusion die (cylindrical, oval, rectangular, star, etc.), but typically they are substantially cylindrical in shape.

The preferred length of the pellets is from about 2 mm, or from about 3 mm, to about 5 mm, or to about 4 mm. The diameter of the pellets is from about 1.2 mm, or from about 2 mm, to about 5 mm, or to about 4 mm. If the pellet is not cylindrical, then the diameter should be taken as the widest part of the pellet.

These dimensions have been found as particularly suitable for balancing plugging effectiveness versus water solubility and speed of plug disintegration, and the plugging agent should preferably comprises a D(90) pellet size within the above dimensions.

One preferred particle size distribution is as follows:

(i) the portion of 10 mesh on (U.S. Sieve Series) is from about 10 wt %, or from about 20 wt %, or from about 25 wt %, to about 69 wt %, or to about 50 wt %, or to about 40 wt %; and (ii) the portion of 10 mesh pass and 16 mesh on is from about 40 wt %, or from about 45 wt %, or from about 50 wt %, to about 90 wt %, or to about 50 wt %, or to about 70 wt %.

Suitable particles sizes for diverting agents can be as set forth in previously incorporated U.S. Pat. No. 3,724,549.

In general, the particle size of a diverting agent may be graded from 3 mesh, or from 4 mesh, to 200 mesh, or to 170 mesh (U.S. Sieve Series). A typical particle size of the diverting agent in accordance with the present invention is from 3 mesh, or from 4 mesh, or from 5 mesh, to 18 mesh, or to 12 mesh, or to 9 mesh. The "mesh" size refers to US standard mesh.

In general, the particle size of the loss circulation material may also be graded from 3 mesh, or from 4 mesh, to 200 mesh, or to 170 mesh (U.S. Sieve Series). A typical particle size of the loss circulation control compositions in accordance with the present invention is from 2 mesh, or from 3 mesh or from 4 mesh. The "mesh" size refers to US standard mesh.

In one embodiment, the lost circulation materials has a D(10) particle size of 4 mesh (U.S. Sieve Series). In another embodiment, the composition has a D(90) particle size of 1 inch.

Particle size distribution can vary widely depending on the permeability of the substrate, carrier fluid, subsurface temperature profile, composition of the plugging agent and other factors recognized by those of ordinary skill in the relevant art.

In one embodiment, the particulate plugging agent preferably has a bulk density of about 0.9 g/mL or greater, or about 0.95 g/mL or greater, or about 1 g/mL or greater, or about 1.1 g/mL or greater, or about 1.2 g/mL or greater, about 1.3 g/mL or greater, or about 1.4 g/mL or greater, or about 1.5 g/mL or greater. In one embodiment, the upper limit of bulk density is about 1.5 g/ml.

In another embodiment, the plugging agent preferably has a bulk density of from about 0.5 g/ml to about 0.8 g/ml.

Bulk density is measured according to ASTM D1895C-17.

Desirably, the bulk density of the particulate plugging agent should be similar to or greater than the carrier fluid used to carry the diverting agent to the subsurface formation.

In some cases, it will be necessary to add fillers (weighting agents) in an amount to reach the desired bulk density, as described above.

Also desirably, the particulate plugging agents are "free-flowing" particles as earlier defined.

Uses of Plugging Agents

The particulate plugging agents of the present invention can be used in fluid injection operations for subsurface wells by processes as generally known to those of ordinary skill in the art, and as exemplified in many of the previously incorporated references.

The particulate plugging agents of the present invention can be used to temporarily plug cracks and decrease (or prevent) fluid and loss into such cracks.

Specific uses include as diverting agents and as loss control materials, as described above.

The plugging agent is designed to be temporary and can be removed by dissolving it using the fluids after completion of the treatment.

As indicated previously, the particulate plugging agents of the present invention are particularly suitable for use in subterranean formations where formation temperatures are typically about 200° F. or lower, although in some cases the particulate plugging agents can have suitable stability for sufficient time periods at temperatures of up to about 250° F.

The following examples will facilitate a more complete understanding of the present invention but it is understood that the invention is not limited to the specific embodiments incorporated therein.

EXAMPLES

The following examples will facilitate a more complete understanding of the present invention but it is understood that the invention is not limited to the specific embodiments incorporated therein.

The resins (C-1, C-2 and C-3) in these examples were polyvinyl alcohol modified with a carboxylic group or its salt. The resins were prepared by the process as described in JP3228564B2.

The resin C1 was a substantially fully-hydrolyzed (vinyl alcohol—itaconic acid or its salt) copolymer having 1700 degree of polymerization, 98.0 mol % degree of hydrolysis and 2 mol % itaconic acid or its salt. Additionally, this resin was dissolved in water and the solution was reprecipitated in methanol to wash the resin. The washing process was conducted three times.

The resin C-2 was a substantially partially-hydrolyzed (vinyl alcohol—itaconic acid or its salt) copolymer having 500 degree of polymerization, 88.0 mol % degree of hydrolysis and 1.5 mol % itaconic acid or its salt. Additionally, this resin was dissolved in water and the solution was reprecipitated in methanol to wash the resin. The washing process was conducted three times.

The resin C-3 was a substantially partially-hydrolyzed (vinyl alcohol—itaconic acid or its salt) copolymer having 1000 degree of polymerization, 95.0 mol % degree of hydrolysis and 1.8 mol % itaconic acid or its salt. Additionally, this resin was dissolved in water and the solution was reprecipitated in methanol to wash the resin. The washing process was conducted three times.

The resin C-4 was a partially-hydrolyzed polyvinyl alcohol homopolymer meeting the characteristics described herein, commercially available under the trade name Kuraray Poval™ 5-88. Additionally, this resin was dissolved in water and the solution was reprecipitated in methanol to wash the resin. The washing process was conducted three times.

100 parts by weight of the resin C-1 and L5 parts by weight of potassium carbonate were mixed by a batch blender, compacted at 8.6 kPa, and then ground to get the plugging agent D-1.

The plugging agent D-2 through D-9 were produced according to the same method as D-1, by changing polyvinyl alcohol (A) resin and monovalent metallic salt (B) and its content, according to the Table 1.

Size Distribution

Particle size of the plugging agents D-1 through D-9 were analyzed by sieving with U.S. Sieve 10 mesh, and 16 mesh. The portion of 10 mesh on and the portion of 10 mesh pass 16 mesh on were summarized in Table 1.

pH Evaluation of the Solution

The plugging agent D-1 through D-9 were fed into a hydrochloric acid solution, followed by stirring at 80 rpm. The amount of the plugging agent, the concentration and the amount of the hydrochloric acid solution are listed in Table 1. After dissolving the plugging agent, pH of the solution was measured and shown in Table 1.

As shown in Table 1, when the specified monovalent metallic salts (B) were used at the appropriate content, the buffering effect was sufficient as the solution showed relatively neutral pH (>3).

TABLE 1

| | Plug. agent | PVOH (A) | Mono. Metallic Salt (B) | Parts (B)/ 100 Parts (A) | Particle size (%) | | Evaluation of the solution | | | |
| | | | | | 10 mesh on | 10 mesh pass 16 mesh on | Plugging agent (g) | HCl (N) | HCl (mL) | pH |
| --- | --- | --- | --- | --- | --- | --- | --- | --- | --- | --- |
| EX 1 | D-1 | C-1 | K Carb. | 1.5 | 35 | 62 | 4 | 0.02 | 40 | 5.2 |
| EX 2 | D-7 | C-7 | K Carb. | 1.5 | 99 | 1 | 4 | 0.02 | 40 | 5.2 |
| EX 3 | D-3 | C-4 | K Carb. | 3.0 | 27 | 67 | 6 | 0.02 | 40 | 5.1 |
| CEX 1 | D-4 | C-4 | — | 0 | 34 | 63 | 6 | 0.02 | 40 | 2.6 |
| CEX 2 | D-5 | C-4 | Na Acet. | 0.01 | 33 | 64 | 6 | 0.02 | 40 | 2.6 |

TABLE 1-continued

| | Plug. agent | PVOH (A) | Mono. Metallic Salt (B) | Parts (B)/ 100 Parts (A) | Particle size (%) 10 mesh on | Particle size (%) 10 mesh pass 16 mesh on | Evaluation of the solution Plugging agent (g) | Evaluation of the solution HCl (N) | Evaluation of the solution HCl (mL) | Evaluation of the solution pH |
|---|---|---|---|---|---|---|---|---|---|---|
| EX 4 | D-6 | C-3 | Na Acet. | 3.0 | 36 | 63 | 6 | 0.1 | 22 | 4.0 |
| EX 5 | D-7 | C-4 | Na Acet. | 5.3 | 99 | 1 | 6 | 0.1 | 22 | 3.1 |
| EX 6 | D-S | C-3 | K Carb. | 6.0 | 34 | 63 | 6 | 0.1 | 22 | 4.3 |
| CEX 3 | D-4 | C-4 | — | 0 | 34 | 63 | 6 | 0.1 | 22 | 1.4 |
| CEX 4 | D-9 | C-1 | — | 0 | 32 | 65 | 4 | 0.1 | 22 | 1.5 |

The invention claimed is:

1. A plugging agent comprising particles of an intimate mixture, the intimate mixture comprising:
   a polyvinyl alcohol resin component (A); and
   from about 0.1 to about 20 parts by weight of a monovalent metallic salt component (B), based on 100 parts by weight of the polyvinyl alcohol resin component (A); wherein,
   the monovalent metallic salt component (B) comprises one or more monovalent metallic salts having a cation selected from lithium, sodium and potassium, and an anion selected from phosphate, carbonate and acetate.

2. The plugging agent according to claim 1, wherein the monovalent metallic salt is selected from potassium carbonate, potassium phosphate, sodium acetate, and mixtures thereof.

3. The plugging agent according to claim 1, wherein the content of the monovalent metallic salt (B) in the particulate plugging agent is from about 0.1 to about 15 parts by weight per 100 parts by weight of polyvinyl alcohol resin component (A).

4. The plugging agent according to claim 1, wherein the polyvinyl alcohol resin component (A) comprises a hydrolyzed copolymer of vinyl acetate and one or more unsaturated acids as comonomers, wherein:
   (a) the unsaturated acid is selected from the group consisting of
      (i) a monocarboxylic unsaturated acid,
      (ii) a dicarboxylic unsaturated acid,
      (iii) an alkyl ester of either (i) or (ii),
      (iv) an alkali metal salt of either (i) or (ii),
      (v) an alkaline earth metal salt of either (i) or (ii), and,
      (vi) an anhydride of either or (ii),
   and,
   (b) the hydrolyzed copolymer
      (i) has an unsaturated acid content of from 0.1 mol % to 15 mol % based on the total moles of monomers,
      (ii) has a viscosity-average degree of polymerization of from 300 to 3000, and,
      (iii) has a degree of hydrolysis of from 70 mol % to 100 mol %.

5. The plugging agent according to claim 1, wherein the polyvinyl alcohol resin component (A) comprises a partially- or fully-hydrolyzed polyvinyl acetate homopolymer.

6. The plugging agent according to claim 1, wherein the polyvinyl alcohol resin component (A) comprises a mixture of two or more different polyvinyl alcohol resins.

7. The plugging agent according to claim 1, wherein the polyvinyl alcohol resin component (A) is a transition product.

8. The plugging agent according to claim 1, further comprising at least one additional additive selected from the group consisting of a plasticizer, starch and a filler.

9. The plugging agent according to claim 1, where the plugging agent has a particle size distribution wherein
   (i) the portion of 10 mesh on (U.S. Sieve Series) is from about 10 wt % to about 60 wt %; and
   (ii) the portion of 10 mesh pass and 16 mesh on is from about 40 wt % to about 90 wt %.

10. The plugging agent according to claim 1, with a particle size ranging from 3 mesh to 200 mesh (U.S. Sieve Series).

11. The plugging agent according to claim 1, wherein the plugging agent has a particle size of from 3 mesh to 18 mesh (U.S. Sieve Series).

12. The plugging agent according to claim 1, having a bulk density of about 0.9 g/mL or greater.

13. The plugging agent according to claim 1, having a bulk density of from about 0.5 g/ml to about 0.8 g/ml.

14. The plugging agent according to claim 1, wherein the plugging agent further comprises from 1 to 30 parts by weight of sand, based on 100 parts by weight of the polyvinyl alcohol resin component (A).

15. A method of treating a subsurface formation to divert flow of a fluid from one zone of the subsurface formation to another, by pumping into the subsurface formation an aqueous carrier liquid having dispersed therein a particulate plugging agent comprising particles of an intimate mixture comprising a polyvinyl alcohol resin component (A) with from about 0.1 to about 20 parts by weight of a monovalent metallic salt component (B), based on 100 parts by weight of the polyvinyl alcohol resin component (A);
   wherein the monovalent metallic salt component (B) comprises one or more monovalent metallic salts having a cation selected from lithium, sodium and potassium, and an anion selected from phosphate carbonate and acetate.

16. The method of claim 15, where the plugging agent is temporary and subsequently removed by dissolution.

17. The method according to claim 15, wherein the monovalent metallic salt is selected from potassium carbonate, potassium phosphate, sodium acetate, and mixtures thereof.

18. The method according to claim 15, wherein the content of the monovalent metallic salt (B) in the particulate plugging agent is from about 0.1 to about 15 parts by weight per 100 parts by weight of polyvinyl alcohol resin component (A).

\* \* \* \* \*